(12) United States Patent
Fu et al.

(10) Patent No.: US 8,276,667 B2
(45) Date of Patent: Oct. 2, 2012

(54) DELAYED BREAKING OF WELL TREATMENT FLUIDS

(75) Inventors: Diankui Fu, Miri (MY); Andrey Fedorov, Tyumen (RU); Olesya Levanyuk, Tyumen (RU); Eric Clum, Sugar Land, TX (US); Larisa Kochmar, Clairmont (CA)

(73) Assignee: Schlumberger Technology Corporation, Sugar Land, TX (US)

( * ) Notice: Subject to any disclaimer, the term of this patent is extended or adjusted under 35 U.S.C. 154(b) by 0 days.

(21) Appl. No.: 12/327,468

(22) Filed: Dec. 3, 2008

(65) Prior Publication Data

US 2010/0132948 A1    Jun. 3, 2010

(51) Int. Cl.
*E21B 43/26* (2006.01)

(52) U.S. Cl. ............ 166/308.5; 166/305.1; 166/300

(58) Field of Classification Search .......... None
See application file for complete search history.

(56) References Cited

U.S. PATENT DOCUMENTS

| | | | |
|---|---|---|---|
| 4,506,734 A | 3/1985 | Nolte | |
| 4,741,401 A | 5/1988 | Walles et al. | |
| 4,884,636 A | 12/1989 | Mumallah et al. | |
| 4,919,209 A | 4/1990 | King | |
| 5,164,099 A | 11/1992 | Gupta et al. | |
| 5,203,834 A * | 4/1993 | Hutchins et al. | 166/270 |
| 5,372,732 A | 12/1994 | Harris et al. | |
| 5,437,331 A * | 8/1995 | Gupta et al. | 166/300 |
| 5,445,223 A | 8/1995 | Nelson et al. | |
| 5,877,127 A | 3/1999 | Card et al. | |
| 6,177,385 B1 | 1/2001 | Nimerick | |
| 6,482,866 B1 | 11/2002 | Dahayanake et al. | |
| 6,703,352 B2 | 3/2004 | Dahayanake et al. | |
| 7,166,560 B2 | 1/2007 | Still et al. | |
| 7,325,615 B2 | 2/2008 | Kriegel et al. | |
| 2006/0027367 A1 * | 2/2006 | Asghari et al. | 166/295 |
| 2006/0243446 A1 | 11/2006 | Kriegel et al. | |

FOREIGN PATENT DOCUMENTS

WO    99/52991 A1    10/1999

\* cited by examiner

*Primary Examiner* — Angela M DiTrani

(74) *Attorney, Agent, or Firm* — Jeremy Tillman; Daryl R. Wright; Robin Nava

(57) ABSTRACT

An embodiment of a downhole method of breaking of a well treatment fluid relates to overcrosslinking a polymeric thickener with an overcrosslinking agent such as an excess crosslinking agent and/or an excess alkaline material, wherein either or both the agent and/or material may be encapsulated.

22 Claims, 1 Drawing Sheet

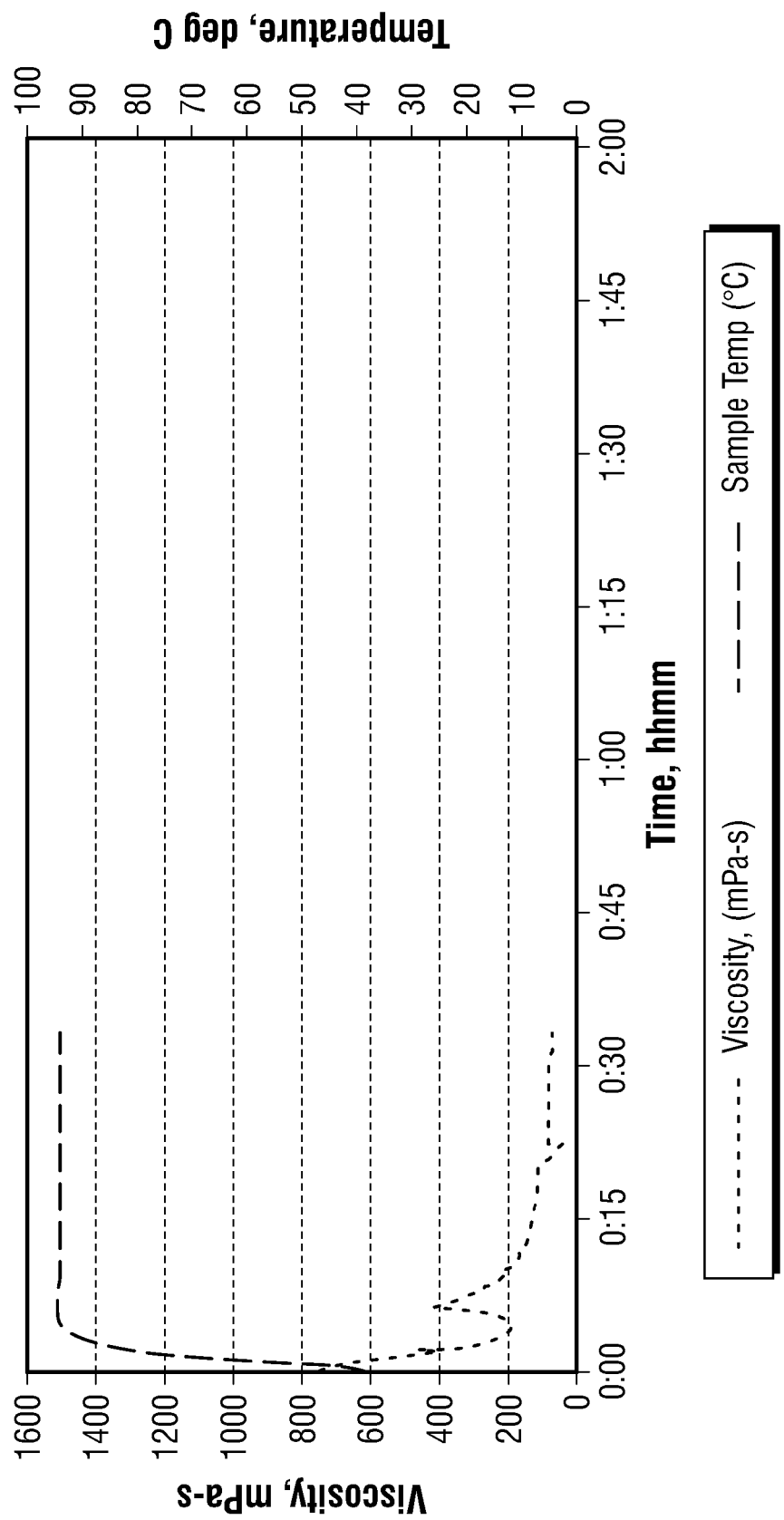

DELAYED BREAKING OF WELL TREATMENT FLUIDS

BACKGROUND

The statements in this section merely provide background information related to the present disclosure and may not constitute prior art.

Disclosed are compositions and methods for treating subterranean formations, in particular, oilfield stimulation compositions and methods using polymer crosslinked with ionic complexes to viscosify the treatment fluid.

High volumes of formation fracturing and other well treatment fluids are commonly thickened with polymers such as guar gum, the viscosity of which is greatly enhanced by crosslinking with an ionic complex, for example of boron or metal such as chromium, aluminum, hafnium, antimony, etc., more commonly a Group 4 metal such as zirconium or titanium. In reference to Periodic Table "Groups," the new IUPAC numbering scheme for the Periodic Table Groups is used as found in HAWLEY'S CONDENSED CHEMICAL DICTIONARY, p. 888 (11th ed. 1987).

During hydraulic fracturing treatments, fluids with high viscosity are needed to create hydraulic fracture as well as transport proppants into the fracture. After the treatment is completed, however, it is necessary that the viscous fluid be broken to facilitate flow back to the surface without bringing back proppants.

Oxidizing agents such as persulfates or bromates are commonly used to break fluids thickened with polymers such as guar. It is widely understood that the mechanism is associated with the breaking of polymer through radical type chain scission reactions. Very often, encapsulated oxidizing agents are used in order that fracturing fluids are not broken prematurely. While oxidizers work effectively in reducing fluid viscosity, it has been observed that the oxidized polymer based fluid often contains insoluble materials which may lead to damaged formation and/or fracture conductivity. Enzymes and the lowering of pH are also sometimes used to break polymer fluids downhole.

Excessive crosslinking of polymers, also known as overcrosslinking, which has accidentally occurred in an uncontrollable manner in the laboratory, is normally avoided in the field, where oxidizers, enzymes and pH lowering agents are the most commonly used breakers.

SUMMARY

Some embodiments relate to breaking fracturing fluids by overcrosslinking after, for example, the placement of proppants during a hydraulic fracturing treatment. As used herein, overcrosslinking occurs when incrementally additional crosslinking results in a relative reduction of the polymer viscosity or molecular weight, or both. Fluids that are overcrosslinked are generally of much lower viscosity, and therefore are easier to flow back, giving rise to higher fracture conductivity. The overcrosslinking in embodiments can be mediated by either higher concentration of crosslinking agent or higher pH, for example, from an excess of hydroxyl source compound, or both. An excess of crosslinking agent and/or base can lead to overcrosslinking of polymer, resulting in a fluid with water-like viscosity. In an embodiment, excess crosslinker and/or caustics can be delivered in encapsulated form to facilitate placement of the proppants.

While overcrosslinking is not desirable during hydraulic fracturing and other treatments where viscous fluids are necessary for transporting proppants into the fractures, it can be beneficial to flowback of the fluid where the overcrosslinking is delayed until after the treatment is otherwise completed. In an embodiment, overcrosslinking a Theological polymer in a controlled manner can be used as a way of breaking fracturing fluids. One embodiment includes the use of encapsulated overcrosslinking agent in fracturing fluid during hydraulic fracturing treatments, and then releasing the overcrosslinking agent after the proppants are in place.

In some other embodiments, methods of treating any suitable structure targeted for treatment are disclosed. In these embodiments, a treatment fluid is prepared and introduced into a structure to be treated. A hydratable polymer is crosslinked to viscosify the treatment fluid, and the crosslinked polymer is overcrosslinked for delayed breaking of the treatment fluid. By suitable structures, it is meant any structure, naturally formed or man made; for example, but not necessarily limited to, a subterranean formation, pipeline, tubing, well bore, container, and the like.

BRIEF DESCRIPTION OF THE DRAWING

The FIGURE shows the rheology profile of a borate-crosslinked guar solution with excess boric acid according to an embodiment of the invention described in Example 1.

DETAILED DESCRIPTION

At the outset, it should be noted that in the development of any such actual embodiment, numerous implementation-specific decisions must be made to achieve the developer's specific goals, such as compliance with system related and business related constraints, which will vary from one implementation to another. Moreover, it will be appreciated that such a development effort might be complex and time consuming but would nevertheless be a routine undertaking for those of ordinary skill in the art having the benefit of this disclosure. In addition, the composition used/disclosed herein can also comprise some components other than those cited. In the summary of the invention and this detailed description, each numerical value should be read once as modified by the term "about" (unless already expressly so modified), and then read again as not so modified unless otherwise indicated in context. Also, in the summary of the invention and this detailed description, it should be understood that a concentration range listed or described as being useful, suitable, or the like, is intended that any and every concentration within the range, including the end points, is to be considered as having been stated. For example, "a range of from 1 to 10" is to be read as indicating each and every possible number along the continuum between about 1 and about 10. Thus, even if specific data points within the range, or even no data points within the range, are explicitly identified or refer to only a few specific, it is to be understood that inventors appreciate and understand that any and all data points within the range are to be considered to have been specified, and that inventors possessed knowledge of the entire range and all points within the range.

Some embodiments relate to a method and system wherein a crosslinked polymer-thickened well treatment fluid is broken after injection into the well bore by overcrosslinking the polymer. A method of treating a subterranean formation penetrated by a well bore, in one embodiment, can comprise the steps of: injecting a treatment fluid in the well bore; crosslinking a hydratable polymer to viscosify the treatment fluid for at least a portion of the injection step; and overcrosslinking the crosslinked polymer for delayed breaking of the treatment fluid. The overcrosslinking in embodiments can comprise reacting the crosslinked polymer with excess crosslinking agent in an amount effective to break the fluid, raising the pH in an amount effective to break the fluid, or a combination thereof, wherein the pH level in combination with the amount of excess crosslinking agent are effective to break the fluid.

The treatment fluid in embodiments can comprise an excess of an alkaline material, which can be encapsulated or non-encapsulated, and/or selected from the group consisting of metal hydroxides, oxides, carbonates, bicarbonates, and the like, and including mixtures and combinations thereof.

The method in one embodiment can further comprise the step of admixing excess crosslinking agent into the treatment fluid in the well bore or in the formation. Alternatively or additionally, the treatment fluid can comprise excess crosslinking agent. The excess crosslinking agent can be encapsulated in an embodiment. The excess crosslinking agent can include in one embodiment, borate, or in another embodiment can be selected from titanate, zirconate, aluminate, and the like, and combinations thereof. In one embodiment, the injection step can comprise hydraulic fracturing of the formation, the treatment fluid can carry proppant for placement in the fracture and/or the fluid can be broken after the proppant placement.

In another aspect, an embodiment of a method of treating a subterranean formation penetrated by a well bore can comprise the steps of: injecting into the well bore a treatment fluid comprising proppant suspended in a carrier thickened with a crosslinked polysaccharide, to deposit proppant in a fracture formed in the formation; thereafter overcrosslinking the crosslinked polymer to break the treatment fluid; and flowing the broken treatment fluid through the fracture back to the wellbore. The treatment fluid in one embodiment comprises an excess of a crosslinking agent, which in other embodiments can be encapsulated or non-encapsulated, and/or selected from borate, titanate, zirconate, aluminate, or the like, including combinations thereof.

In an embodiment, all or a portion of the excess crosslinking agent can remain as a solid during the injection and thereafter dissolve for the overcrosslinking step. The treatment fluid in embodiments can comprise an excess of an alkaline material, which can be encapsulated or non-encapsulated, and/or selected from the group consisting of metal hydroxides, oxides, carbonates, bicarbonates, and the like, and including combinations thereof.

Carrier fluid. The carrier fluid in various embodiments can be aqueous, non-aqueous, oil based, or a mixture of water and a water-immiscible liquid such as synthetic or mineral oil, including emulsions and invert emulsions, and the like. In another embodiment, the carrier fluid can include a gas phase component, e.g., in an energized fluid or foam, such as, for example, carbon dioxide, air, nitrogen, natural gas, or the like, including mixtures thereof.

In an embodiment the polymer is hydratable, and where the carrier fluid includes an aqueous component, the polymer can be generally stable in the presence of dissolved salts. Accordingly, ordinary tap water, produced water, brines, and the like can be used to prepare the polymer solution used in an embodiment. In embodiments where the carrier fluid is a brine, the brine is water comprising an inorganic salt or organic salt. In embodiments, inorganic salts include alkali metal halides, such as potassium chloride, for example. The carrier brine phase may also comprise an organic salt, such as, for example, sodium or potassium formate. Embodiments of inorganic divalent salts include calcium halides, such as calcium chloride or calcium bromide. Sodium bromide, potassium bromide, or cesium bromide may also be used. The salt can in an embodiment be chosen for compatibility reasons, e.g., where the reservoir drilling fluid used a particular brine phase and the completion/clean up fluid brine phase is chosen to have the same brine phase. Some salts can also function as stabilizers, e.g. clay stabilizers such as KCl or tetramethylammonium chloride (TMAC), and/or charge screening of ionic polymers.

Thickening polymers. In embodiments, the polymer is sufficiently soluble or dispersible in the carrier fluid to amend the Theological properties, e.g., water soluble or hydratable in the case of fluids having an aqueous phase, or oil- or solvent-soluble where the fluid has a water-immiscible phase of oil or solvent.

The polymer thickening agent in an embodiment is a high molecular weight water-soluble polysaccharide containing cis-hydroxyl and/or carboxylate groups that can form a complex with a borate, metal or other crosslinking agent. Without limitation, useful polysaccharides for the practice of this invention have molecular weights in the range of about 200,000 to about 3,000,000. Galactomannans represent an embodiment of polysaccharides having adjacent cis-hydroxyl groups for the purposes of the invention. The term galactomannans refers in various aspects to natural occurring polysaccharides derived from various endosperms of seeds. They are primarily composed of D-mannose and D-galactose units. They generally have similar physical properties, such as being soluble in water to form thick highly viscous solutions which usually can be gelled (crosslinked) by the addition of such inorganic salts as borax. Examples of some plants producing seeds containing galactomannan gums include tara, huisache, locust bean, palo verde, flame tree, guar bean plant, honey locust, lucerne, Kentucky coffee bean, Japanese pagoda tree, indigo, jenna, rattlehox, clover, fenergruk seeds, soy bean hulls and the like. The gum is provided in a convenient particulate form. Of these polysaccharides, guar and its derivatives represent a specific embodiment. These include guar gum, carboxymethyl guar, hydroxyethyl guar, carboxymethylhydroxyethyl guar, hydroxypropyl guar (HPG), carboxymethylhydroxypropyl guar (CMHPG), guar hydroxyalkyltriammonium chloride, and combinations thereof. As a galactomannan, guar gum is a branched copolymer containing a mannose backbone with galactose branches.

Heteropolysaccharides, such as diutan, xanthan, diutan mixture with any other polymers, and scleroglucan may be used as the hydratable polymer. Synthetic polymers such as, but not limited to, polyacrylamide and polyacrylate polymers and copolymers are used typically for high-temperature applications.

The hydratable polymer may be present at any suitable concentration. In various embodiments, the hydratable polymer can be present in an amount of from about 1.2 to less than about 7.2 g/L (10 to 60 pounds per thousand gallons or ppt) of liquid phase, or from about 15 to less than about 40 pounds per thousand gallons, from about 1.8 g/L (15 ppt) to about 4.2 g/L (35 ppt), 1.8 g/L (15 ppt) to about 3 g/L (25 ppt), or even from about 2 g/L (17 ppt) to about 2.6 g/L (22 ppt). Generally, the hydratable polymer can be present in an amount of from about 1.2 g/L (10 ppt) to less than about 6 g/L (50 ppt) of liquid phase, with a lower limit of polymer being no less than about 1.2, 1.32, 1.44, 1.56, 1.68, 1.8, 1.92, 2.04, 2.16 or 2.18 g/L (10, 11, 12, 13, 14, 15, 16, 17, 18, or 19 ppt) of the liquid phase, and the upper limit being less than about 7.2 g/L (60 ppt), no greater than 7.07, 6.47, 5.87, 5.27, 4.67, 4.07, 3.6, 3.47, 3.36, 3.24, 3.12, 3, 2.88, 2.76, 2.64, 2.52, or 2.4 g/L (59, 54, 49, 44, 39, 34, 30, 29, 28, 27, 26, 25, 24, 23, 22, 21, or 20 ppt) of the liquid phase. In some embodiments, the polymers can be present in an amount of about 2.4 g/L (20 ppt) or about 3.6 g/L (30 ppt).

Fluids incorporating a hydratable polymer may, prior to crosslinking and overcrosslinking, have any suitable viscosity, and in various embodiments, a viscosity value of about 50 mpa-s or greater at a shear rate of about 100 s$^{-1}$ at treatment temperature, about 75 mpa-s or greater at a shear rate of about 100 s$^{-1}$, and about 100 mPa-s or greater. At the concentrations mentioned, the hydration rate is independent of guar concentration. Use of lower levels tends to lead to development of insufficient viscosity, while higher concentrations tend to waste material. Where those disadvantages are avoided, higher and lower concentrations are useful.

When a polymer is referred to as comprising a monomer or comonomer, the monomer is present in the polymer in the polymerized form of the monomer or in the derivative from the monomer. However, for ease of reference the phrase comprising the (respective) monomer or the like may be used as shorthand.

Crosslinking agents. In an embodiment, the crosslinking agents provide two sequential functions. During injection or other use of the treatment fluid where a highly viscous fluid is needed, a first portion of the crosslinking agent is available for traditional crosslinking of the polymer to further thicken the treatment fluid. Following primary treatment operations, which can include fracturing or carrying proppant into a fracture in specific nonlimiting embodiments, when it is desired to remove the treatment fluid, in one embodiment a second portion of the crosslinking agent provides an excess of the crosslinking agent effective to break the polymer or treatment fluid. The first and second crosslinking agent portions can be the same or different, e.g., one crosslinking agent can be used for rheological modification of the carrier fluid during treatment and another crosslinking agent for overcrosslinking and fluid breaking.

An excess of available crosslinking agent exists when, with an incremental increase of the crosslinking agent, the polymer solution begins to experience a reduction in effective molecular weight, viscosity or both. Overcrosslinking, as used herein, is not limited to any particular mechanisms or phenomena by which the excess crosslinking agent effects a reduction in effective molecular weight and/or viscosity.

Crosslinking is often but not always effected by a polyvalent crosslinking agent molecule or complex reacting with reactive sites on two or more polymer chains. When the crosslinking agent is the limited reactant in the polymer solution or dispersion, and the reactive polymer sites are readily available on adjacent polymer chains, the crosslinking can entangle the polymer chains and effectively increase the polymer molecular weight and the viscosity of the solution. As the proportion of crosslinking agent is increased relative to the polymer binding sites, more crosslinking is effected and the effective molecular weight increases; but as the crosslinking agent concentration is further increased, in one embodiment there can be a point when the crosslinking agent molecules begin to bind only to a single polymer bonding site and are prevented from binding to another polymer chain because the adjacent bonding sites are already reacted with another crosslinking agent molecule, effectively inhibiting crosslink formation, such that additional crosslinking agent will effectively reduce the molecular weight of the polymer and the viscosity of the solution.

Further, like polarity of the monovalent crosslinking agent can also provide charge repulsion in one embodiment further serving to inhibit the overlapping and/or availability of adjacent polymer chain bonding sites. Where the crosslinking agent is irreversibly bound to the polymer chains in an embodiment, the addition of excess crosslinking agent can break the polymer by displacing polyvalently bound crosslinking agent molecules or complexes by monovalent ones.

Another embodiment of overcrosslinking includes polymer collapse or disentanglement, e.g., syneresis. In this embodiment, an excess of crosslinking agent can cause the polymer chains to hold tightly together and collapse into a discrete particle, expelling water and inhibiting loose chains from entangling with the chains of other polymer molecules. The polymer no longer forms an overlapping network so that, while the molecular weight of the overcrosslinked polymer is not necessarily reduced, the rheological effects on the carrier fluid are minimized. Further, the polymer chains and/or crosslinking sites can be sensitive to shear which can result in chain or crosslink scission, which especially in the case of excess irreversible crosslinking agents, can further assist the fluid break in this embodiment. In embodiments, a broken fluid has a viscosity at formation conditions similar to or less than the fluid wherein the polymer is non-crosslinked, or similar to the carrier fluid per se without polymer, such as, for example, a viscosity value of about 100 mPa-s or less at a shear rate of about 100 s-1 at formation temperature, about 75 mPa-s or less at a shear rate of about 100 s-1, or about 50 mPa-s or less.

The overcrosslinking in embodiments can result from the presence of excess crosslinking agent per se, or from an alteration of conditions that favor the formation of the reactive form of the active crosslinking agent species. For example, increasing the pH can result in the conversion of boric acid, which is a species of crosslinking agent that is essentially inert to crosslinking, to borate, which readily reacts to crosslink polymers such as guar and its derivatives. A suitable delay of the overcrosslinking can be obtained, for example, by encapsulation of the excess crosslinking agent or hydroxyl source compound, by incorporation in a slowly dissolvable or degradable matrix or other physical form, by the use of crosslink delay agents, or the like.

Borate crosslinkers. In the case of borate-crosslinked gels, increasing the pH and therefore increasing the effective concentration of the active crosslinker, the borate anion, reversibly create the borate crosslinks. Lowering the pH can just as easily reduce the available borate and thus inhibit the borate/polymer bonds. At a high pH above 8, the borate ion exists and is available to crosslink and cause gelling. At lower pH, the borate is tied up by hydrogen and is not available for crosslinking, thus gelation by borate ion is reversible. A borate source(s) can be used in an embodiment as a crosslinker or co-crosslinker, and/or excess crosslinking agent for overcrosslinking.

In one embodiment, low temperature, reversible crosslinking with a borate source is used for generally continuous viscosification before the polymer is crosslinked with a metal compound, or simultaneously therewith. The aqueous mixture can thus include a borate source, which can either be included as a soluble borate or borate precursor such as boric acid, or it can be provided as a slurry of borate source solids for delayed borate crosslinking until the fluid is near exit from the tubular into the downhole formation. By definition, "slurry" is a mixture of suspended solids and liquids. The slurry in one embodiment can be prepared at or near the site of the well bore or can be prepared at a remote location and shipped to the site of its intended use. Methods of preparing slurries are known in the art. In one embodiment, the slurry is prepared offsite, since this can reduce the expense associated with the transport of equipment, materials and expertise for the preparation of a slurry on site.

The term "mesh" as used in the present application means the Tyler mesh size. The Tyler mesh size is a scale of particle size in powders. The particle size can be categorized by sieving or screening, that is, by running the sample through a specific sized screen. The particles can be separated into two or more size fractions by stacking the screens, thereby determining the particle size distribution.

Solid borate crosslinking agents suitable in certain embodiments of the present invention are water-reactive and insoluble in a non-aqueous slurry, but become soluble when the slurry is mixed with the aqueous medium. In certain embodiments, the solids will include a slowly soluble boron-containing mineral. These may include borates, such as anhydrous borax and borate hydrate, e.g. sodium tetraborate.

The term "non-aqueous" as used in the present application in one sense refers to a composition to which no water has been added as such, and in another sense refers to a composition the liquid phase of which comprises no more than 1, 0.5, 0.1 or 0.01 weight percent water based on the weight of the liquid phase. The liquid phase of the borate slurry in embodiments can be a hydrocarbon or oil such as naphtha, kerosene or diesel, or a non-oily liquid. In the case of hydrophobic liquids such as hydrocarbons, the solubilization of the borate solids is delayed because the water must penetrate the hydrophobic coating on the solids.

In one embodiment, the liquid phase of the borate slurry can include a hygroscopic liquid which is generally non-aqueous and non-oily. The liquid can have strong affinity for water to keep the water away from any crosslinking agent, which would otherwise reduce the desired delay of crosslinking, i.e. accelerate the gelation. Glycols, including glycol-ethers, and especially including glycol-partial-ethers, represent one class of hygroscopic liquids. Specific representative examples of ethylene and propylene glycols include ethylene glycol, diethylene glycol, triethylene glycol, propylene glycol, dipropylene glycol, tripropylene glycol, $C_1$ to $C_8$ monoalkyl ethers thereof, and the like. Additional examples include 1,3-propanediol, 1,4-butanediol, 1,4-butenediol, thiodiglycol, 2-methyl-1,3-propanediol, pentane-1,2-diol, pentane-1,3-diol, pentane-1,4-diol, pentane-1,5-diol, pentane-2,3-diol, pentane-2,4-diol, hexane-1,2-diol, heptane-1,2-diol, 2-methylpentane-2,4-diol, 2-ethylhexane-1,3-diol, $C_1$ to $C_8$ monoalkyl ethers thereof, and the like.

In one embodiment, the hygroscopic liquid can include glycol ethers with the molecular formula R—OCH$_2$CHR$^1$OH, where R is substituted or unsubstituted hydrocarbyl of about 1 to 8 carbon atoms and R$^1$ is hydrogen or alkyl of about 1 to 3 carbon atoms. Specific representative examples include solvents based on alkyl ethers of ethylene and propylene glycol, commercially available under the trade designation CELLOSOLVE, DOWANOL, and the like. Note that it is conventional in the industry to refer to and use such alkoxyethanols as "solvents," but in an embodiment of the present invention the slurried borate solids should not be soluble in the liquid(s) used in the borate slurry.

The liquid phase of the borate slurry can have a low viscosity that facilitates mixing and pumping, e.g. less than 50 cP (50 mPa-s), less than 35 cP (35 mPa-s), or less than 10 cP (10 mPa-s) in different embodiments. The slurry liquid can in one embodiment contain a sufficient proportion of the glycol to maintain hygroscopic characteristics depending on the humidity and temperature of the ambient air to which it may be exposed, i.e. the hygroscopic liquid can contain glycol in a proportion at or, in one embodiment, exceeding the relative humectant value thereof. As used herein, the relative humectant value is the equilibrium concentration in percent by weight of the glycol in aqueous solution in contact with air at ambient temperature and humidity, e.g. 97.2 weight percent propylene glycol for air at 48.9° C. (120° F.) and 10% relative humidity, or 40 weight percent propylene glycol for air at 4.4° C. (40° F.) and 90% relative humidity. In other embodiments, the hygroscopic liquid can comprise at least 50 percent by weight in the slurry liquid phase (excluding any insoluble or suspended solids) of the glycol, at least 80 percent by weight, at least 90 percent by weight, at least 95 percent by weight, or at least 98 percent by weight.

If desired, in one embodiment, the borate slurry can also include a suspension aid to help distance the suspended solids from each other, thereby inhibiting the solids from clumping and falling out of the suspension. The suspension aid can include silica, organophilic clay, polymeric suspending agents, other thixotropic agents or a combination thereof. In certain embodiments the suspension aid can include polyacrylic acid, an ether cellulosic derivative, polyvinyl alcohol, carboxymethylmethylcellulose, polyvinyl acetate, thiourea crystals or a combination thereof. As a crosslinked acrylic acid based polymer that can be used as a suspension aid, there may be mentioned the liquid or powdered polymers available commercially under the trade designation CARBOPOL. As an ether cellulosic derivative, there may be mentioned hydroxypropyl cellulose. Suitable organophilic clays include kaolinite, halloysite, vermiculite, chlorite, attapullgite, smectite, montmorillonite, bentonite, hectorite or a combination thereof.

In various embodiments, the borate slurry component can include crosslinking delay agents such as a polyol compound, including sorbitol, mannitol, sodium gluconate and combinations thereof. The crosslink delay agent can provide performance improvement in the system through increased crosslink delay in the initial thickening of the fluid, enhanced gel strength when the polymer is less than fully hydrated, and enhanced rate of shear recovery. The crosslink delay agent can alternatively or additionally serve, in an embodiment, to delay the availability of the borate source or a portion thereof for overcrosslinking. In an embodiment, the polyol can be present in an amount effective for improved shear recovery. Further, the polyol can be present in an amount that is not effective as a breaker or breaker aid.

Metal crosslinkers. The crosslinking agent in one embodiment is a metal compound, such as, for example, a complex of a Group 4 metal and a ligand. The molar ratio of metal to ligand in the complex can range from 1:1 to 1:10. In embodiments, the ratio of metal to ligand can range from 1:1 to 1:6; or from 1:1 to 1:4. Those complexes, including mixtures thereof, can be used to crosslink and/or overcrosslink the hydratable polymers. For a given polymer the crosslinking and/or overcrosslinking by metal- or metal-complex occurs at substantially higher temperatures than by metal complexes formed without any ligand or only with weak-binding ligands. Various embodiments of ligands can include: alkanolamines, like triethanolamine; alpha hydroxy carboxylates, like lactate; amino acids, like D,L-glutamic acid, L-glutamic acid, D-glutamic acid, D,L-aspartic acid, D-aspartic acid, L-aspartic acid, beta-alanine, D,L-alanine, D-alanine, L-alanine; phosphonic acids, like phosphonoacetic acid; and like compounds that are also known as crosslinking delay agents, including combinations and mixtures thereof.

When ligands are described as comprising neutral stable forms or ionic forms of the compounds, for example, in the preparation of crosslinking agent complexes, it is well understood by one skilled in the art, that the ionic form or other derivatized form of the component is the form that reacts with the crosslinking agent. When crosslinkers are used in wellbore treatment fluids for subterranean applications, in one embodiment, a water soluble polymer is placed into and hydrated in a mixer with water, which can contain other ingredients such as surfactants, salts, buffers, and temperature stabilizers. A concentrated crosslinker solution, comprising from 1000 ppm of a metal-ligand complex, for example, up to saturation, is added prior to the fluid mixture being pumped into the well to provide the desired concentration of the metal in the injected fluid mixture. The liquid crosslinker additive concentrations for thickening applications typically range from about 0.01 volume percent to 1.0 percent by volume, based upon total volume of the liquid phase; for overcrosslinking/breaking embodiments, excess crosslinking agent is required in greater proportions than for viscosification. In an embodiment, a molar ratio of crosslinking agent, such as boron, to saccharide units in the polymer, effective for overcrosslinking to break the fluid is at least about 1:120. In one embodiment, the appropriate proportions of crosslinking agent for thickening and breaking are determined on a case by case basis in the lab in advance of the treatment.

Alkaline materials. Non-limiting examples of hydroxyl ion releasing agent include any soluble or partially soluble hydroxide or carbonate that provides the desirable pH value in the fracturing fluid to promote crosslinking agent ion formation, e.g., borate ion one embodiment, and crosslinking and/or overcrosslinking with the polymer. The alkali metal hydroxides, e.g., sodium hydroxide, and carbonates are representative embodiments. Other exemplary materials include calcium hydroxide, magnesium hydroxide, bismuth hydroxide, lead hydroxide, nickel hydroxide, barium hydroxide, strontium hydroxide, and the like. At temperatures above about 79° C. (175° F.), potassium fluoride (KF) can be used to prevent the precipitation of MgO when magnesium hydroxide is used as a hydroxyl ion releasing agent. The amount of the hydroxyl ion releasing agent used in various embodiments is sufficient to yield a crosslinking pH value in the fracturing fluid of at least about 8.0, at least 8.5, at least about 9.5, or between about 9.5 and about 12; and to yield an overcrosslinking pH value in the post-fracturing fluid of at least about 9, at least about 9.5, at least about 10, at least about 10.5, at least about 11, at least about 11.5, or between about 12 and 14.

A buffering agent may be employed to buffer the fracturing fluid, i.e., moderate amounts of either a strong base or acid may be added without causing any large change in pH value of the fracturing fluid. In various embodiments, the buffering agent is a combination of: a weak acid and a salt of the weak acid; an acid salt with a normal salt; or two acid salts. Examples of suitable buffering agents are: $NaH_2PO_4$—$Na_2HPO_4$; sodium carbonate—sodium bicarbonate; sodium bicarbonate; and the like. By employing a buffering agent in addition to a hydroxyl ion producing material, a fracturing fluid is provided which can, prior or subsequent to breaking by overcrosslinking, be more stable to a wide range of pH values found in local water supplies and to the influence of acidic materials located in formations and the like. In an exemplary embodiment, the pH control agent is varied between about 0.6 percent and about 40 percent by weight of the polysaccharide employed.

Carrier fluid embodiments may also comprise an organoamino compound. Examples of suitable organoamino compounds include, but are not necessarily limited to, tetraethylenepentamine (TEPA), triethylenetetramine, pentaethylenhexamine, triethanolamine (TEA), and the like, or any mixtures thereof. Organoamines may be used to adjust (increase) pH, for example. When organoamino compounds are used in fluids of the invention, they are incorporated at an amount from about 0.01 weight percent to about 2.0 weight percent based on total liquid phase weight for crosslinking, or in excess of 2 weight percent where the organamino contributes to increasing the pH for overcrosslinking. In an embodiment, when used, the organoamino compound is incorporated at an amount from about 0.05 weight percent to about 1.0 weight percent based on total liquid phase weight.

Encapsulation. In one embodiment, the crosslinking agent and/or alkaline material is encapsulated during treatment, e.g. in the pad, and in the carrier fluid, and after pump shut down and/or fracture closure, the capsule releases or activates the excess crosslinker or hydroxy releasing compound. Before pump shut down or before closure, the encapsulation or other delaying mechanism inhibits the release and consequently makes the break of the polymer a delayed reaction. Upon closure of the fracture, in one embodiment, the increasing stress ruptures the encapsulation and releases the overcrosslinking agent, which can then overcrosslink the polymer to break the fluid. In an alternate or additional embodiment, the overcrosslinking agent can be encapsulated with a material that results in bursting by osmotic pressure, that facilitates electrochemical rupture, that dissolves in a controlled manner at treatment conditions, or the like. For example, formation temperature and fluid pH changes can be used to initiate the overcrosslinking reaction after pump shut down.

In embodiments, the overcrosslinking agent can be encapsulated with polyglycolic acid (PGA), polylactic acid (PLA), or other slowly hydrolysable polyester that forms acid and lowers the pH at the formation conditions, as described in U.S. Pat. No. 7,166,560 (Still), hereby incorporated by reference in its entirety, as well as those other references listed herein below in this paragraph. Various techniques for encapsulation are known that can be used to manufacture the encapsulated overcrosslinking agent in the present invention. U.S. Pat. No. 4,506,734 discloses hollow beads that are crushed. U.S. Pat. No. 4,741,401 discloses capsules that rupture under influence of a fluid that can permeate the coating. U.S. Pat. No. 4,919,209 discloses capsules with contents dissolved in a fluid. U.S. Pat. No. 5,164,099 discloses diffusion through a membrane capsule. Also, the overcrosslinking agent can be deployed in a slurry or emulsion of oil such as diesel.

Other methods for encapsulating the overcrosslinking agent can include: (1) spray coating by spraying a melt or solution of encapsulating material into a fluid bed of the overcrosslinking agent particles; (2) spraying the overcrosslinking agent with a wax of a given melting point commensurate with the reservoir temperature; (3) pelletizing the overcrosslinking agent with a binder that breaks apart and releases the overcrosslinking agent; (4) fluidized bed coating such as the Glatt process with appropriate modification for obtaining the desired particle size; and (5) pan coating where the overcrosslinking agent is immersed in a solution in which the polymer or other encapsulating material is dissolved (and the overcrosslinking agent is insoluble) and then dried to form a film or coating on the overcrosslinking agent particles.

Surfactants. Some fluids according to some embodiments may also include a surfactant. Nonlimiting examples of suitable surfactants that are present in embodiments of some fluids include cationic surfactants, anionic surfactants, zwitterionic surfactants, amphoteric surfactants, nonionic surfactants, and combinations thereof. Alternatively or additionally, any surfactant which aids the dispersion and/or stabilization of a gas component in the base fluid to form an energized fluid can be used. Viscoelastic surfactants, such as those described in U.S. Pat. No. 6,703,352 and U.S. Pat. No. 6,482,866, both incorporated herein by reference, are also suitable for use in fluids in an embodiment of the invention.

Examples of suitable ionic surfactants also include, but are not limited to, amphoteric surfactants or zwitterionic surfactants. Amphoteric surfactants have both a positively charged moiety and a negatively charged moiety over a certain pH range (e.g. typically slightly acidic), only a negatively charged moiety over a certain pH range (e.g. typically slightly alkaline) and only a positively charged moiety at a different pH range (e.g. typically moderately acidic), while a zwitterionic surfactant has a permanently positively charged moiety in the molecule regardless of pH and also a negatively charged moiety at alkaline pH. Zwitterionic surfactants can be used to charge screen anionic polymers regardless of pH and cationic polymers at the appropriate pH. Amphoteric polymers may be used to charge screen cationic and/or anionic polymers depending on the fluid pH. Alkyl betaines, alkyl amido betaines, alkyl imidazolines, alkyl amine oxides and alkyl quaternary ammonium carboxylates are typically zwitterionic surfactants.

In some embodiments, the surfactant is a cationic, zwitterionic or amphoteric surfactant containing an amine group and/or a quaternary ammonium group in its chemical structure, referred to in the art as amine functional surfactants. A particularly useful surfactant is the amphoteric alkyl amine contained in the surfactant solution AQUAT 944® (available from Baker Petrolite of Sugar Land, Tex.).

In other embodiments, the surfactant is a blend of two or more of the surfactants described above, or a blend of any of the surfactant or surfactants described above with one or more nonionic surfactants. Examples of suitable nonionic surfactants include, but are not limited to, alkyl alcohol ethoxylates, alkyl phenol ethoxylates, alkyl acid ethoxylates, alkyl amine ethoxylates, sorbitan alkanoates and ethoxylated sorbitan alkanoates. Any effective amount of surfactant or blend of surfactants may be used in aqueous energized fluids of the invention. In embodiments, the fluids incorporate the surfactant or blend of surfactants in an amount of about 0.02 weight percent to about 5 weight percent of total liquid phase weight, or from about 0.05 weight percent to about 2 weight percent of total liquid phase weight. One particularly useful surfactant is sodium tridecyl ether sulfate.

Friction reducers may also be incorporated in some fluids used in some embodiments. Any friction reducer polymer such as polyacrylamide and copolymers, partially hydrolyzed polyacrylamide, poly(2-acrylamido-2-methyl-1-propane sulfonic acid) (polyAMPS), and polyethylene oxide may be used. Commercial drag reducing chemicals such as those sold by Conoco Inc. under the trademark "CDR" as described in U.S. Pat. No. 3,692,676 or drag reducers such as those sold by Chemlink designated under the trademarks FLO1003, FLO1004, FLO1005 and FLO1008 have also been found to be effective. These polymeric species added as friction reducers or viscosity index improvers may also act as excellent fluid loss additives reducing or even eliminating the need for conventional fluid loss additives. Latex resins or polymer emulsions may be incorporated as fluid loss additives. Shear recovery agents may also be used in embodiments of the invention.

Other breakers. In one embodiment, the treatment fluid comprising excess crosslinking agent and/or hydroxyl source compounds can be used without other conventional breakers, e.g. free or essentially free of other intentionally added breakers, or breakers in an amount that affects the overcrosslinking, or containing less than 1, 0.5, 0.2, 0.1, or 0.01 weight percent other breakers besides the excess crosslinking agent and/or hydroxyl source compounds, by weight of the polymer. In another embodiment, fluids based on the invention may also comprise a supplemental breaker. The purpose of this component is to facilitate the overcrosslinking break to further diminish the viscosity of the fluid so that this fluid is more easily recovered from the formation during cleanup, for example. With regard to supplemental breakers, oxidizers and/or enzymes may be used. In an embodiment, where the supplemental breaker does not interfere with overcrosslinking by excess hydroxyl source compounds, for example, the supplemental breaker can comprise an acid.

Proppants. Embodiments may also include proppant particles that are substantially insoluble in the fluids of the formation. Proppant particles carried by the treatment fluid remain in the fracture created, thus propping open the fracture when the fracturing pressure is released and the well is put into production. Suitable proppant materials include, but are not limited to, sand, walnut shells, sintered bauxite, glass beads, ceramic materials, naturally occurring materials, or similar materials. Mixtures of proppants can be used as well. If sand is used, it will typically be from about 20 to about 100 U.S. Standard Mesh in size. With synthetic proppants, mesh sizes about 8 or greater may be used. Naturally occurring materials may be underived and/or unprocessed naturally occurring materials, as well as materials based on naturally occurring materials that have been processed and/or derived. Suitable examples of naturally occurring particulate materials for use as proppants include, but are not necessarily limited to: ground or crushed shells of nuts such as walnut, coconut, pecan, almond, ivory nut, brazil nut, etc.; ground or crushed seed shells (including fruit pits) of seeds of fruits such as plum, olive, peach, cherry, apricot, etc.; ground or crushed seed shells of other plants such as maize (e.g., corn cobs or corn kernels), etc.; processed wood materials such as those derived from woods such as oak, hickory, walnut, poplar, mahogany, etc. including such woods that have been processed by grinding, chipping, or other form of particulation, processing, etc. Further information on nuts and composition thereof may be found in ENCYCLOPEDIA OF CHEMICAL TECHNOLOGY, Edited by Raymond E. Kirk and Donald F. Othmer, Third Edition, John Wiley & Sons, vol. 16, pp. 248-273, (1981).

The concentration of proppant in the fluid can be any concentration known in the art, and in an embodiment can be in the range of from about 0.03 to about 3 kilograms of proppant added per liter of liquid phase. Also, any of the proppant particles can further be coated with a resin to potentially improve the strength, clustering ability, and flow back properties of the proppant.

Fibers. A fiber component may be included in the fluids to achieve a variety of properties including improving particle suspension, and particle transport capabilities, and gas phase stability. Fibers used may be hydrophilic or hydrophobic in nature, but hydrophilic fibers represent a specific embodiment. Fibers can be any fibrous material, such as, but not necessarily limited to, natural organic fibers, comminuted plant materials, synthetic polymer fibers (by non-limiting example polyester, polyaramide, polyamide, novoloid or a novoloid-type polymer), fibrillated synthetic organic fibers, ceramic fibers, inorganic fibers, metal fibers, metal filaments, carbon fibers, glass fibers, ceramic fibers, natural polymer fibers, and any mixtures thereof. Particularly useful fibers are polyester fibers coated to be highly hydrophilic, such as, but not limited to, DACRON® polyethylene terephthalate (PET) Fibers available from Invista Corp. Wichita, Kans., USA, 67220. Other examples of useful fibers include, but are not limited to, polylactic acid polyester fibers, polyglycolic acid polyester fibers, polyvinyl alcohol fibers, and the like. When used in fluids of the invention, the fiber component may be included in embodiments at concentrations from about 1 to about 15 grams per liter of the liquid phase of the fluid, from about 2 to about 12 grams per liter of liquid, or from about 2 to about 10 grams per liter of liquid.

Other additives. Fluid embodiments may further contain other additives and chemicals that are known to be commonly used in oilfield applications by those skilled in the art. These include, but are not necessarily limited to, materials such as surfactants in addition to those mentioned hereinabove, breaker aids in addition to those mentioned hereinabove, oxygen scavengers, alcohol stabilizers, scale inhibitors, corrosion inhibitors, fluid-loss additives, bactericides and biocides such as 2,2-dibromo-3-nitrilopropionamine or glutaraldehyde, and the like. Also, they may include a co-surfactant to optimize viscosity or to minimize the formation of stable emulsions that contain components of crude oil.

As used herein, the term "alcohol stabilizer" is used in reference to a certain group of organic molecules substantially or completely soluble in water containing at least one hydroxyl group, which are susceptible of providing thermal stability and long term shelf life stability to aqueous zirconium complexes. Examples of organic molecules referred as "alcohol stabilizers" include but are not limited to methanol, ethanol, n-propanol, isopropanol, n-butanol, tert-butanol, ethyleneglycol monomethyl ether, and the like.

Hydraulic fracturing. The fluids may be used for hydraulically fracturing a subterranean formation. Techniques for hydraulically fracturing a subterranean formation are known to persons of ordinary skill in the art, and involve pumping a fracturing fluid into the borehole and out into the surrounding formation. The fluid pressure is above the minimum in situ rock stress, thus creating or extending fractures in the formation. See Stimulation Engineering Handbook, John W. Ely, Pennwell Publishing Co., Tulsa, Okla. (1994), U.S. Pat. No. 5,551,516 (Normal et al.), "Oilfield Applications," Encyclopedia of Polymer Science and Engineering, vol. 10, pp. 328-366 (John Wiley & Sons, Inc. New York, N.Y., 1987) and references cited therein.

In various embodiments, hydraulic fracturing involves pumping a proppant-free viscous fluid, or pad—usually water with some fluid additives to generate high viscosity—into a well faster than the fluid can escape into the formation so that the pressure rises and the rock breaks, creating artificial fractures and/or enlarging existing fractures. Then, proppant particles are added to the fluid to form slurry that is pumped into the fracture to prevent it from closing when the pumping pressure is released. In the fracturing treatment, fluids are used in the pad treatment, the proppant stage, or in a post-proppant flush stage, or any combination.

The excess crosslinking agent or other overcrosslinking initiator can be included in stages containing the crosslinked polymer, or in a separate stage or stages for mixing with the crosslinked polymer-containing stages. During the fracturing or other treatment, the overcrosslinking is delayed for an appropriate period to complete the treatment while it is desired to maintain fluid viscosity, e.g. until fracture closure or flow back. Then, the overcrosslinking begins, e.g., by rupture or other induced failure of the encapsulated excess crosslinking agent or hydroxyl source compound. After overcrosslinking has sufficiently reduced the fluid viscosity, e.g., after an appropriate shut in period following treatment in one embodiment, the well can be produced and the carrier fluid removed from the fracture by flow back to the well bore.

Example. Delayed overcrosslinking with an excess borate source was demonstrated in a guar-based fluid containing 3.6 kg/m$^3$ (30 lb/1000 gal (ppt)) guar derivative, 2 weight percent potassium chloride and a commercial surfactant in produced water from the Bobrovskoe field. After thoroughly hydrating the polymer at ambient temperature, borate and boric acid were added simultaneously to the fluid in a blender for thorough mixing, the mixture was transferred to a rheometer and heated to 95° C. at a shear rate of 100 s$^{-1}$ while recording the viscosity. The borate was a slurry of 50 weight percent ulexite in oil, and added to the fluid in an amount of 3.5 L per m3 of fluid. Boric acid in granules was added in an amount of 0.6 kg per m$^3$ of fluid. The viscosity curve is seen in the FIGURE and shows the fluid held a viscosity above 200 mPa-s for about 10 minutes, but was completely broken after 15 to 30 minutes.

Although various embodiments have been described with respect to enabling disclosures, it is to be understood the invention is not limited to the disclosed embodiments. Variations and modifications that would occur to one of skill in the art upon reading the specification are also within the scope of the invention, which is defined in the appended claims.

We claim:

1. A method of treating a subterranean formation penetrated by a well bore, the method comprising:
    injecting a treatment fluid in the well bore;
    crosslinking a hydratable polymer to viscosify the treatment fluid for at least a portion of the injection; and,
    overcrosslinking the crosslinked polymer for decrease the viscosity of the treatment fluid;
    wherein the injection comprises hydraulic fracturing of the formation, the treatment fluid carries proppant for placement in the fracture, and the fluid viscosity is decreased after the proppant placement, and
    wherein the treatment fluid does not contain a breaker.

2. The method of claim 1, wherein the overcrosslinking comprises reacting the crosslinked polymer with excess crosslinking agent in an amount effective to break the fluid.

3. The method of claim 1, wherein the overcrosslinking comprises raising the pH in an amount effective to break the fluid.

4. The method of claim 3 wherein the treatment fluid comprises an excess of an alkaline material.

5. The method of claim 4 wherein the excess alkaline material is encapsulated.

6. The method of claim 4 wherein the excess alkaline material is selected from the group consisting of metal hydroxides, oxides, carbonates, bicarbonates and combinations thereof.

7. The method of claim 1, wherein the overcrosslinking comprises raising the pH and reacting the crosslinked polymer with excess crosslinking agent, wherein the pH level in combination with the amount of excess crosslinking agent are effective to break the fluid.

8. The method of claim 1, further comprising admixing excess crosslinking agent into the treatment fluid in the well bore or in the formation.

9. The method of claim 1 wherein the treatment fluid comprises excess crosslinking agent.

10. The method of claim 9 wherein the excess crosslinking agent is encapsulated.

11. The method of claim 9 wherein the excess crosslinking agent comprises borate.

12. The method of claim 9 wherein the excess crosslinking agent is selected from the group consisting of titanate, zirconate, aluminate, and combinations thereof.

13. A method of treating a subterranean formation penetrated by a well bore, the method comprising:
    injecting into the well bore a treatment fluid comprising proppant suspended in a carrier thickened with a crosslinked polysaccharide, to deposit proppant in a fracture formed in the formation;

thereafter overcrosslinking the crosslinked polymer to decrease the viscosity of the treatment fluid;

flowing the broken treatment fluid through the fracture back to the wellbore, wherein the treatment fluid does not contain a breaker.

14. The method of claim 13 wherein the treatment fluid comprises an excess of a crosslinking agent.

15. The method of claim 14 wherein the excess crosslinking agent is encapsulated.

16. The method of claim 15 wherein the excess crosslinking agent is selected from the group consisting of borate, titanate, zirconate, aluminate and combinations thereof.

17. The method of claim 14 wherein all or a portion of the excess crosslinking agent remains as a solid during the injection and thereafter dissolves for the overcrosslinking step.

18. The method of claim 13 wherein the treatment fluid comprises an excess of an alkaline material.

19. The method of claim 18 wherein the excess alkaline material is encapsulated.

20. The method of claim 19 wherein the excess alkaline material is selected from the group consisting of metal hydroxides, oxides, carbonates, bicarbonates and combinations thereof.

21. A method comprising:

preparing a treatment fluid and introducing the treatment fluid into a structure to be treated;

crosslinking a hydratable polymer to viscosify the treatment fluid; and, overcrosslinking the crosslinked polymer to decrease the viscosity of the treatment fluid;

wherein the injection comprises hydraulic fracturing of the formation, the treatment fluid carries proppant for placement in the fracture, and the fluid viscosity is decreased after the proppant placement, and wherein the treatment fluid does not contain a breaker.

22. A method of treating a subterranean formation penetrated by a well bore, the method comprising:

injecting a treatment fluid in the well bore;

crosslinking a hydratable polymer to viscosify the treatment fluid for at least a portion of the injection; and, overcrosslinking the crosslinked polymer to increase flow back to the well bore;

wherein the injection comprises hydraulic fracturing of the formation, the treatment fluid carries proppant for placement in the fracture, and the fluid viscosity is decreased after the proppant placement, and wherein the treatment fluid does not contain a breaker.

* * * * *